United States Patent
Negami

(10) Patent No.: US 10,309,476 B2
(45) Date of Patent: Jun. 4, 2019

(54) SBR COMPOSITION FOR TORSIONAL DAMPER, AND TORSIONAL DAMPER

(71) Applicant: NOK Corporation, Tokyo (JP)

(72) Inventor: Tetsuro Negami, Tottori (JP)

(73) Assignee: NOK CORPORATION, Tokyo (JP)

( * ) Notice: Subject to any disclaimer, the term of this patent is extended or adjusted under 35 U.S.C. 154(b) by 253 days.

(21) Appl. No.: 15/523,772

(22) PCT Filed: Oct. 27, 2015

(86) PCT No.: PCT/JP2015/080243
§ 371 (c)(1),
(2) Date: May 2, 2017

(87) PCT Pub. No.: WO2016/080160
PCT Pub. Date: May 26, 2016

(65) Prior Publication Data
US 2017/0314631 A1     Nov. 2, 2017

(30) Foreign Application Priority Data

Nov. 17, 2014  (JP) ................................ 2014-232985

(51) Int. Cl.
| | |
|---|---|
| *F16F 15/36* | (2006.01) |
| *F16F 1/36* | (2006.01) |
| *C08K 3/04* | (2006.01) |
| *C08K 3/06* | (2006.01) |
| *C08K 5/14* | (2006.01) |
| *C08K 5/36* | (2006.01) |
| *C08L 9/06* | (2006.01) |
| *F16F 15/136* | (2006.01) |
| *C08K 13/02* | (2006.01) |
| *F16F 15/124* | (2006.01) |

(52) U.S. Cl.
CPC ............ *F16F 1/3605* (2013.01); *C08K 3/04* (2013.01); *C08K 3/06* (2013.01); *C08K 5/14* (2013.01); *C08K 5/36* (2013.01); *C08K 13/02* (2013.01); *C08L 9/06* (2013.01); *F16F 15/136* (2013.01); *F16F 15/1245* (2013.01); *F16F 2224/025* (2013.01)

(58) Field of Classification Search
CPC ......... F16F 1/3605; C08K 13/02; C08K 3/04; C08K 3/06; C08K 5/36; C08K 5/14; C08L 9/06

See application file for complete search history.

(56) References Cited

U.S. PATENT DOCUMENTS

2012/0232208 A1* 9/2012 Saito .................. C08K 3/04
524/493

FOREIGN PATENT DOCUMENTS

| JP | 579061 | 10/1993 |
|---|---|---|
| JP | 08-269240 A | 10/1996 |
| JP | 09-143278 A | 6/1997 |
| JP | 2001-240702 A | 9/2001 |
| JP | 2004292631 | 10/2004 |
| JP | 2009-096980 A | 5/2009 |
| JP | 2009174720 | 8/2009 |
| JP | 201132384 | 2/2011 |
| JP | 2013-185026 A | 9/2013 |

OTHER PUBLICATIONS

International Search Report and Written Opinion for corresponding International Application No. PCT/JP2015/080243 dated Jan. 19, 2016 and English translation.
Extended European Search for corresponding European Application No. 15861622.7 dated Jul. 10, 2018.
Notification of Reasons for Refusal dated Jan. 7, 2019 for corresponding Japanese Application No. 2014-232985 and English translation.

* cited by examiner

*Primary Examiner* — Peter D. Mulcahy
(74) *Attorney, Agent, or Firm* — Pearne & Gordon LLP

(57) ABSTRACT

An object of the present invention is to provide an SBR composition for a torsional damper in which the SBR composition has a good physical property balance of high load-bearing properties, low CS properties, and the kneadability and roll processability of a rubber material, and to provide a torsional damper. The object is achieved in such a manner that the SBR composition for the torsional damper comprises at least: (a) an SBR polymer having a combined styrene content of 10 wt % to 50 wt %; (b) carbon black comprising FEF grade carbon black and HAF grade carbon black blended at a ratio of FEF:HAF=1:3 to 3:1; (c) a crosslinking system including sulfur, a sulfur-donating compound, and an organic peroxide compound; and (d) a co-crosslinking agent, wherein 60 parts by weight to 100 parts by weight of the carbon black as total parts by weight of the FEF grade carbon black and the HAF grade carbon black is blended based on 100 parts by weight of the SBR polymer, 0.4 part by weight to 2.5 parts by weight of the sulfur is blended based on 100 parts by weight of the SBR polymer, the sulfur-donating compound is blended at 0.625 time to 12.5 times the blending amount of the sulfur, the organic peroxide compound is blended at 1.25 times to 12.5 times the blending amount of the sulfur, and 4 parts by weight to 16 parts by weight of the co-crosslinking agent is blended based on 100 parts by weight of the SBR polymer.

4 Claims, No Drawings

SBR COMPOSITION FOR TORSIONAL DAMPER, AND TORSIONAL DAMPER

TECHNICAL FIELD

The present invention relates to an SBR composition for a torsional damper, and a torsional damper including a crosslinked product obtained by crosslinking said composition.

BACKGROUND

Torsional dampers are a vibration-absorbing device used in a flywheel, a clutch disc, or a driving system to absorb torque variations of a combustion engine or an electric motor (Patent Documents 1 and 2).

Such a torsional damper is freely fitted into a coil spring arranged in the direction of relative rotation as an elastic means disposed between a driving plate connected to a driving source and a driven plate coupled to a driven source.

The torsional damper is an approximately cylindrical cushion formed of a composite comprising a resin material and a rubber material.

When the relative rotation of a driving plate and a hub exceeds a predetermined value due to a sudden torque change between an engine and a input shaft caused by a shift change of a vehicle or a sudden increase in torque generated by a driving source, a torsional damper is compressively deformed together with a coil spring, reduces impact torque by the elasticity of the torsional damper, and at the same time, prevents buffer wear of the spring coil when the coil is compressed.

Patent Document 3 discloses a specific EPDM (ethylene propylene diene rubber) composition as a rubber material used for torsional dampers.

PRIOR ART DOCUMENTS

Patent Documents

Patent Document 1: JP-UM-A-H05-79061
Patent Document 2: JP-A-2009-174720
Patent Document 3: Japanese Patent No. 4140415
Patent Document 4: JP-A-2011-32384

SUMMARY OF THE INVENTION

Problem to be Solved by the Invention

A rubber material used for torsional dampers is required to have the following functions.

(1) The rubber material has high load-bearing properties to reduce buffer wear of a spring coil during compressive deformation.

(2) The rubber material exhibits a small decrease in repulsive stress (compression set rate) over time in a high-temperature use range (100° C.) to reduce impact torque generated at the time of compression over the long term (hereinafter, the compression set rate may be referred to as CS properties).

(3) The rubber material has good kneadability and good roll processability.

Conventional rubber materials still had a room for further improvement in terms of satisfying all of these required characteristics. That is, the conventional rubber materials needed to be highly filled with a filler for the rubber materials to attain high load-bearing properties, but as a consequence, low CS properties and the kneadability and roll processability of the rubber materials were easily impaired. Therefore, it was difficult to set a formulation offering a good physical property balance of high load-bearing properties, low CS properties, and the kneadability and roll processability of the rubber materials.

Patent Document 4 discloses a rubber composition for damping materials. An SBR (styrene-butadiene rubber) is used in Examples, but such a rubber composition did not satisfy the above-described characteristics required for a rubber material used for torsional dampers.

The inventors of the present invention made intensive studies and found that the use of a specific SBR composition makes it possible to favorably satisfy these required characteristics, and the present invention has been accomplished.

An object of the present invention is to provide an SBR composition for a torsional damper, the SBR composition having a good physical property balance of high load-bearing properties, low CS properties, and the kneadability and roll processability of a rubber material, and to provide a torsional damper.

Other objects of the present invention will become apparent from the following description.

Means for Solving Problem

The above-described problems are solved by the following respective inventions.

1. An SBR composition for a torsional damper, the SBR composition comprising:

(a) an SBR polymer having a combined styrene content of 10 wt % to 50 wt %;

(b) carbon black comprising FEF grade carbon black and HAF grade carbon black blended at a ratio of FEF:HAF=1:3 to 3:1;

(c) a crosslinking system including sulfur, a sulfur-donating compound, and an organic peroxide compound; and (d) a co-crosslinking agent, wherein 60 parts by weight to 100 parts by weight of the carbon black as total parts by weight of the FEF grade carbon black and the HAF grade carbon black is blended based on 100 parts by weight of the SBR polymer, 0.4 part by weight to 2.5 parts by weight of the sulfur is blended based on 100 parts by weight of the SBR polymer, and the sulfur-donating compound is blended at 0.625 time to 12.5 times the blending amount of the sulfur, the organic peroxide compound is blended at 1.25 times to 12.5 times the blending amount of the sulfur, and 4 parts by weight to 16 parts by weight of the co-crosslinking agent is blended based on 100 parts by weight of the SBR polymer.

2. An SBR composition for a torsional damper, the SBR composition comprising:

(a) an SBR polymer having a combined styrene content of 10 wt % to 50 wt %;

(b) carbon black comprising FEF grade carbon black and HAF grade carbon black blended at a ratio of FEF:HAF=1:3 to 3:1;

(c) a crosslinking system including sulfur, a sulfur-donating compound, and an organic peroxide compound; and (d) a co-crosslinking agent, wherein a value Y of Formula (1) below is Y≤63, $$Y=A(2.5-0.02A)-B-2C-2.4D \qquad \text{Formula (1)}$$

where A is total parts by weight of the FEF grade carbon black and the HAF grade carbon black based on 100 parts by weight of the SBR polymer; B is the number of parts by weight of the co-crosslinking agent based on 100 parts by weight of the SBR polymer; C is the number of parts by weight of the sulfur-donating compound based on 100 parts by weight of the SBR polymer; and D is the number of parts by weight of the organic peroxide crosslinking agent based on 100 parts by weight of the SBR polymer.

3. A torsional damper, comprising a crosslinked product obtained by crosslinking the SBR composition for a torsional damper according to 1 or 2.

Effect of the Invention

The present invention can provide an SBR composition for a torsional damper, the SBR composition having a good physical property balance of high load-bearing properties, low CS properties, and the kneadability and roll processability of a rubber material, and provide a torsional damper.

DESCRIPTION OF THE PREFERRED EMBODIMENTS

Embodiments of the present invention will be described below.

First Invention

An SBR composition for a torsional damper according to the present invention comprises at least an SBR polymer, carbon black, a crosslinking system, and a co-crosslinking agent.

(SBR Polymer)

The SBR polymer denotes a styrene butadiene rubber polymer, and the SBR polymer used here has a combined styrene content of 10 wt % to 50 wt %.

The combined styrene content of the SBR polymer is preferably in a range of 15 wt % to 46 wt %.

Two or more kinds of SBR polymers may be blended and used, as necessary.

(Carbon Black)

As the carbon black, a blend of FEF (Fast Extruding Furnace) grade carbon black and HAF (High Abrasion Furnace) grade carbon black is used. The blending of the above-mentioned two specific grades of carbon black makes it possible to improve the kneadability and roll processability of a rubber material.

The blending ratio is in a range of FEF:HAF=1:3 to 3:1, preferably FEF:HAF=1:2 to 2:1, and more preferably FEF:HAF=1:1.

Furthermore, the total parts by weight of these FEF grade carbon black and HAF grade carbon black is in a range of from 60 parts by weight to 100 parts by weight based on 100 parts by weight of the SBR polymer. When the total parts by weight of the carbon black is 60 parts by weight or more, particularly excellent load-bearing properties are attained, while when the total parts by weight thereof is 100 parts by weight or less, particularly low CS properties and excellent kneadability are attained.

Carbon black that can be preferably used in the present invention is commercially available, and examples of the carbon black include "FEF carbon/SEAST G-SO" (primary particle diameter: 40 nm to 48 nm) and "HAF carbon/SEAST 3", each manufactured by TOKAI CARBON CO., LTD.

Here, the primary particle diameter means an average diameter obtained by measuring and calculating small spherical components (having a microcrystalline profile and being inseparable) constituting a carbon black aggregate from an electron micrograph, and this diameter is the same as that defined as a particle diameter in No. 48, Carbon Black Yearbook 1998, published by Carbon Black Association. Furthermore, an arithmetic average is used for calculating the primary particle diameter in the present invention.

(Crosslinking System)

The crosslinking system includes sulfur, a sulfur-donating compound, and an organic peroxide compound. In the present invention, such crosslinking system is characterized by being used in combination with a later-described co-crosslinking agent, and furthermore, for attaining the effects of the present invention, it is important to use the crosslinking system under a condition such that the above-described carbon black formed of a combination of the FEF grade carbon black and the HAF grade carbon black is blended in.

The blending amount of sulfur ranges from 0.4 part by weight to 2.5 parts by weight, preferably 0.5 part by weight to 2.0 parts by weight part, and most preferably 0.6 part by weight to 1.5 parts by weight, based on 100 parts by weight of the SBR polymer. When the blending amount of the sulfur is 0.4 part by weight or more, the effect of improving load-bearing properties is enhanced, and the effect of suitably preventing crosslinking (vulcanization) retardation is attained, while when the blending amount thereof is 2.5 parts by weight or less, the effect of improving heat resistance characteristics is enhanced.

The sulfur-donating compound is not particularly limited as long as the compound has sulfur-donating properties, and examples of the sulfur-donating compound include tetrabenzylthiuram disulfide, tetrakis(2-ethylhexyl) thiuram disulfide, zinc tetrabenzyldithiocarbamate, and 1,6-bis(N,N-dibenzylthiocarbamodithio)hexane. Among these, tetramethylthiuram disulfide is preferable, such tetramethylthiuram disulfide is available as "NOCCELER TT", manufactured by OUCHI SHINKO CHEMICAL INDUSTRIAL CO., LTD.

The organic peroxide compound is not limited to a particular one, and examples of the organic peroxide compound include dicumyl peroxide, benzoyl peroxide, di-t-butyl peroxide, 2,5-dimethyl-2,5-di-(t-butylperoxy)hexane, 1,3-di-(t-butylperoxy) isopropylbenzene, m-toluyl peroxide, and dipropionyl peroxide. Among these, dicumyl peroxide is preferable, and is available as "PERCUMYL D", manufactured by NOF CORPORATION.

The blending amounts of the sulfur-donating compound and the organic peroxide crosslinking agent are determined in relation to the above-described blending amount of the sulfur.

The blending amount of the sulfur-donating compound is 0.625 time to 12.5 times the blending amount of the sulfur.

The blending amount of the organic peroxide crosslinking agent is 1.25 time to 12.5 times the blending amount of the sulfur.

(Co-Crosslinking Agent)

Preferable examples of the co-crosslinking agent include alkyl esters, alycyclic-, aromatic-, heterocyclic-, or vinyl-group-containing esters, hydroxy(alkoxy) containing esters, dialkylaminoethyl esters, di- or tri-methacrylic acid esters, carboxylic acid containing esters, and fluoroalkyl esters.

Examples of the alkyl esters include ethyl methacrylate, n-butyl methacrylate, i-butyl methacrylate, t-butyl methacrylate, 2-ethylhexyl methacrylate, lauryl methacrylate, alkyl methacrylate (preferably $C_{12}$ or $C_{13}$ alkyl methacrylate), tridecyl methacrylate, and stearyl methacrylate.

Examples of the alicyclic-, aromatic-, heterocyclic-, or vinyl-group-containing esters include cyclohexyl methacrylate, phenyl methacrylate, benzyl methacrylate, isobornyl methacrylate, glycidyl methacrylate, glycidyl methacrylate, tetrahydrofurfuryl methacrylate, and allyl methacrylate.

Examples of the hydroxy(alkoxy) containing esters include 2-hydroxyethyl methacrylate, 2-hydroxyethyl methacrylate, hydroxypropyl methacrylate, 2-methoxyethyl methacrylate, and 2-ethoxyethyl methacrylate.

Examples of the dialkylaminoethyl esters include dimethylaminoethyl methacrylate, dimethylaminoethyl methacrylate methyl chloride salt, dimethylaminoethyl methacrylate benzyl chloride salt, and diethylaminoethyl methacrylate.

Examples of the di- or tri-methacrylic acid esters include ethylene glycol dimethacrylate, triethylene glycol dimethacrylate, 1,3-butylene glycol dimethacrylate, 1,6-hexanediol dimethacrylate, polypropylene glycol dimethacrylate, and trimethylolpropane trimethacrylate.

Examples of the carboxylic acid containing esters include 2-methacryloyloxyethyl phthalic acid, and 2-methacryloyloxyethyl hexahydrophthalic acid.

Examples of the fluoroalkyl esters include trifluoroethyl methacrylate.

Among these, a multifunctional compound having two or more functional groups is preferable, and preferable specific examples of the multifunctional compound include di- or tri-methacrylic acid esters, such as ethylene glycol dimethacrylate and trimethylolpropane trimethacrylate.

The ethylene glycol dimethacrylate is available as "Acryester ED", manufactured by MITSUBISHI RAYON CO., LTD., and the trimethylolpropane trimethacrylate is available as "Acryester TMP", manufactured by MITSUBISHI RAYON CO., LTD.

The blending amount of the co-crosslinking agent ranges from 4 parts by weight to 16 parts by weight, based on 100 parts by weight of the SBR polymer. When the blending amount of the co-crosslinking agent is 4 parts by weight or more, the effect of improving load-bearing properties is enhanced, while when the blending amount thereof is 16 parts by weight or less, low CS properties is achieved.

Second Invention

The first invention is the formulation of the SBR composition, and is characterized by the composition of the composition itself (composition factors) and the blending amount thereof.

As a result of an analysis of the blending amount of each of the composition factors in the first invention, it was found that the blending amount of each of the composition factors can be summarized into a specific relational expression, and the second invention has been thus accomplished.

The second invention has a technical characteristic in common with the first invention in terms of providing an SBR composition for a torsional damper that has a good physical property balance of high load-bearing properties, low CS properties, and the kneadability and roll processability of a rubber material, and of providing a torsional damper.

That is, the second invention is characterized in that the blending amount of each of the composition factors is determined so as to satisfy Y 63, where Y is a value calculated from Formula (1) below.

$$Y=A(2.5-0.02A)-B-2C-2.4D \quad \text{Formula (1)}$$

In Formula (1) above, A is the blending amount of the carbon black as the total parts by weight of the FEF grade carbon black and the HAF grade carbon black; B is the blending amount of Acryester; C is the blending amount of the sulfur-donating compound; and D is the blending amount of the organic peroxide cross-linking agent. Here, each of the blending amounts is expressed by the number of parts by weight based on 100 parts by weight of the SBR polymer.

The value calculated from Formula (1) above is preferably 58 or less, and most preferably 55 or less, whereby, particularly, excellent load-bearing properties are attained.

(Torsional Damper)

The torsional damper of the present invention includes a crosslinked product obtained by the crosslinking of the above-described SBR composition for a torsional damper.

An SBR (rubber) as a crosslinked product is obtained by the crosslinking of the SBR composition for a torsional damper. Such an SBR is excellent in high load-bearing properties and has less degradation in CS properties, and therefore when the SBR is used for a torsional damper, the effects are remarkably exhibited.

The crosslinking system and the co-crosslinking agent contained in the SBR composition allow the crosslinking to proceed. Conditions for the crosslinking are not particularly limited.

Molding is preferably carried out together with the crosslinking of the SBR composition. Specifically, for example, press molding under heating conditions allows crosslinking and molding to be carried out.

EXAMPLES

Examples of the present invention are hereinafter described, but the invention is not limited to the examples.

Example 1

As the SBR polymer, an emulsion-polymerized SBR polymer (E-SBR-1) ("Nipol 1502", manufactured by Zeon Corporation) having a styrene content of 23.5 wt % was prepared.

To 100 parts by weight of such an SBR polymer, 60 parts by weight of carbon black comprising the FEF grade carbon black and the HAF grade carbon black blended at a ratio of FEF:HAF=1:1 was added, and 10 parts by weight of a co-crosslinking agent ("Acryester TMP", manufactured by MITSUBISHI RAYON CO., LTD.) and 0.8 part by weight of sulfur were added thereto, and then, a sulfur-donating compound ("NOCCELER TT", manufactured by OUCHI SHINKO CHEMICAL INDUSTRIAL CO., LTD.) and an organic peroxide crosslinking agent ("PERCUMYL D", manufactured by NOF CORPORATION) were added thereto at, respectively, 1.88 times (1.5 parts by weight) and 3.75 times (3.0 parts by weight) the parts by weight of the sulfur, whereby a composition was obtained.

Example 2

A composition was obtained in the same manner as in Example 1, except that the blending amount of carbon black added to 100 parts by weight of the SBR was 80 parts by weight. The carbon black used here was carbon black comprising FEF grade carbon black and HAF grade carbon black blended at FEF:HAF=1:1 (=40 parts by weight: 40 parts by weight).

Example 3

A composition was obtained in the same manner as in Example 1, except that the blending amount of carbon black added to 100 parts by weight of the SBR polymer was 100 parts by weight. The carbon black used here was carbon black comprising FEF grade carbon black and HAF grade carbon black blended at FEF:HAF=1:1 (=50 parts by weight: 50 parts by weight).

Example 4

A composition was obtained in the same manner as in Example 1, except that the blending amount of carbon black added to 100 parts by weight of the SBR polymer was 80 parts by weight, and the weight ratio of FEF grade to HAF grade in said carbon black was FEF:HAF=3:1 (=60 parts by weight:20 parts by weight).

Example 5

A composition was obtained in the same manner as in Example 1, except that the blending amount of carbon black added to 100 parts by weight of the SBR polymer was 80 parts by weight, and the weight ratio of FEF grade to HAF grade in said carbon black was FEF:HAF=1:3 (=20 parts by weight: 60 parts by weight).

Example 6

A composition was obtained in the same manner as in Example 2, except that the blending amount of Acryester added to 100 parts by weight of the SBR polymer was 4 parts by weight.

Example 7

A composition was obtained in the same manner as in Example 2, except that the blending amount of Acryester added to 100 parts by weight of the SBR polymer was 16 parts by weight.

Example 8

A composition was obtained in the same manner as in Example 2, except that the sulfur-donating compound was added at 0.625 time (0.5 part by weight based on 100 parts by weight of the SBR polymer) the parts by weight of the sulfur (0.8 part by weight based on 100 parts by weight of the SBR polymer).

Example 9

A composition was obtained in the same manner as in Example 2, except that the sulfur-donating compound was added at 12.5 times (10 parts by weight based on 100 parts by weight of the SBR polymer) the parts by weight of the sulfur (0.8 part by weight based on 100 parts by weight of the SBR polymer).

Example 10

A composition was obtained in the same manner as in Example 2, except that the organic peroxide crosslinking agent was added at 1.25 times (1.0 part by weight based on 100 parts by weight of the SBR polymer) the parts by weight of the sulfur (0.8 part by weight based on 100 parts by weight of the SBR polymer).

Example 11

A composition was obtained in the same manner as in Example 2, except that the organic peroxide crosslinking agent was added at 12.5 times (10 parts by weight based on 100 parts by weight of the SBR polymer) the parts by weight of the sulfur (0.8 part by weight based on 100 parts by weight of the SBR polymer).

Example 12

A composition was obtained in the same manner as in Example 1, except that the blending amount of the co-crosslinking agent added to 100 parts by weight of the SBR polymer was 7.5 parts by weight, and the sulfur-donating compound and the organic peroxide crosslinking agent were added at, respectively, 1.25 times (1.0 part by weight based on 100 parts by weight of the SBR polymer) and 3.13 times (2.5 parts by weight based on 100 parts by weight of the SBR polymer) the parts by weight of the sulfur (0.8 part by weight based on 100 parts by weight of the SBR polymer).

Example 13

A composition was obtained in the same manner as in Example 2, except that, as the SBR polymer, a solution-polymerized SBR polymer (S-SBR-1) having a styrene content of 15.0 wt % was used.

Example 14

A composition was obtained in the same manner as in Example 2, except that, as the SBR polymer, an emulsion-polymerized SBR polymer (E-SBR-2) having a styrene content of 46.0 wt % was used.

Comparative Example 1

A composition was obtained in the same manner as in Example 1, except that the blending amount of carbon black added to 100 parts by weight of the SBR polymer was 40 parts by weight. The carbon black used here was carbon black comprising FEF grade carbon black and HAF grade carbon black blended at FEF:HAF=1:1 (=20 parts by weight: 20 parts by weight).

Comparative Example 2

A composition was obtained in the same manner as in Example 1, except that the blending amount of carbon black added to 100 parts by weight of the SBR polymer was 120 parts by weight. The carbon black used here was carbon black comprising FEF grade carbon black and HAF grade carbon black blended at FEF:HAF=1:1 (=60 parts by weight: 60 parts by weight).

Comparative Example 3

A composition was obtained in the same manner as in Example 1, except that, as the carbon black added to 100 parts by weight of the SBR polymer, only FEF grade carbon black was used, and the blending amount of the carbon black was 80 parts by weight.

Comparative Example 4

A composition was obtained in the same manner as in Example 1, except that, as the carbon black added to 100 parts by weight of the SBR polymer, only HAF grade carbon black was used, and the blending amount of the carbon black was 80 parts by weight.

Comparative Example 5

A composition was obtained in the same manner as in Example 2, except that, the blending amount of the co-crosslinking agent added to 100 parts by weight of the SBR polymer was 20 parts by weight.

Comparative Example 6

A composition was obtained in the same manner as in Example 2, except that the sulfur-donating compound was added at 0.125 times (0.1 part by weight based on 100 parts by weight of the SBR polymer) the parts by weight of sulfur (0.8 part by weight based on 100 parts by weight of the SBR polymer).

<Evaluation Method>

Each of the compositions obtained in Examples and Comparative Examples above was evaluated for the following evaluation items.

(1) Kneadability

The kneadability of each of the compositions obtained in Examples and Comparative Examples was evaluated by the following evaluation criteria.

<Evaluation Criteria>

◯: A composition that was good in any of the following evaluation items (I) to (III) was rated as ◯.

Δ: A composition that was poor in one of the following evaluation items (I) to (III) was rated as Δ.

X: A composition that was poor in two or more of the following evaluation items (I) to (III) was rated as.

<Evaluation Items>

(I) The time for kneading is 20 minutes or shorter.

(II) At the time of kneading with a kneader, a kneading process stably proceeds without the formation of a bridge (rubber lump) in a gap between a rotor and a weight.

Furthermore, even when a bridge is formed during the kneading, there is not a process required for preventing the bridge condition while interrupting the kneading work by flipping a dough-like material (green stock) or the like.

(III) There is no contamination of a kneader after a dough-like material (green stock) is sent out.

(2) Roll Processability

The roll processability of each of the compositions obtained in Examples and Comparative Examples was evaluated by the following evaluation criteria.

<Evaluation Criteria>

◯: A rubber dough-like material (green stock) is stuck fast to a roller without separating therefrom, a bank rotates smoothly, and good roll processability is exhibited.

Δ: slightly poor

X: poor (3) CS Properties

The CS properties of a rubber obtained by crosslinking each of the compositions obtained in Examples and Comparative Examples was examined.

<Test Conditions>

According to JIS K6262:2006, large-sized test piece: 29±0.5 mm in diameter and 12.5±0.5 mm in thickness, and 25% compression ratio.

A rubber in which CS properties at 100° C. 70 h are 10% or less is rated as good.

(4) Load-Bearing Properties

The load-bearing properties of a rubber obtained by crosslinking each of the compositions obtained in Examples and Comparative Examples were examined.

<Test Conditions>

CS button: in accordance with JIS K6262:2006, large-sized test piece: 29±0.5 mm in diameter and 12.5±0.5 mm in thickness A CS button in which the maximum load obtained when the button is compressed by 23% at a constant speed of 10 mm/min is 3,000 N or more is rated as good. Said maximum load is preferably 4,000 N or more, and more preferably 5,000 N or more.

Tables 1 to 3 show the evaluation results.

TABLE 1

| | | Example 1 | Example 2 | Example 3 | Example 4 | Example 5 | Example 6 | Example 7 |
|---|---|---|---|---|---|---|---|---|
| Formulation (part by weight) | E-SBR-1 | 100 | 100 | 100 | 100 | 100 | 100 | 100 |
| | S-SBR-1 | | | | | | | |
| | E-SBR-2 | | | | | | | |
| | FEF carbon black | 30 | 40 | 50 | 60 | 20 | 40 | 40 |
| | HAF carbon black | 30 | 40 | 50 | 20 | 60 | 40 | 40 |
| | Sulfur | 0.8 | 0.8 | 0.8 | 0.8 | 0.8 | 0.8 | 0.8 |
| | Sulfur-donating compound | 1.5 | 1.5 | 1.5 | 1.5 | 1.5 | 1.5 | 1.5 |
| | Organic peroxide crosslinking agent | 3.0 | 3.0 | 3.0 | 3.0 | 3.0 | 3.0 | 3.0 |
| | Co-crosslinking agent | 10 | 10 | 10 | 10 | 10 | 4 | 16 |
| Polymer characteristics | Combined-styrene content (wt %) | 23.5 | 23.5 | 23.5 | 23.5 | 23.5 | 23.5 | 23.5 |
| | A (2.5-0.2A)-B-2C-2.4D | 58 | 52 | 30 | 52 | 52 | 58 | 46 |
| | Kneadability | ◯ | ◯ | ◯ | ◯ | ◯ | ◯ | ◯ |
| | Roll processability | ◯ | ◯ | ◯ | ◯ | ◯ | ◯ | ◯ |
| | CS properties (%): 100° C., 70 h | 6 | 8 | 9 | 7 | 8 | 6 | 10 |
| | Maximum load (N) | 4,200 | 5,500 | 11,000 | 5,600 | 5,600 | 4,100 | 7,200 |

TABLE 2

| | | Example 8 | Example 9 | Example 10 | Example 11 | Example 12 | Example 13 | Example 14 |
|---|---|---|---|---|---|---|---|---|
| Formulation (part by weight) | E-SBR-1 | 100 | 100 | 100 | 100 | 100 | | |
| | S-SBR-1 | | | | | | 100 | |
| | E-SBR-2 | | | | | | | 100 |
| | FEF carbon black | 40 | 40 | 40 | 40 | 30 | 40 | 40 |

TABLE 2-continued

|  |  | Example 8 | Example 9 | Example 10 | Example 11 | Example 12 | Example 13 | Example 14 |
|---|---|---|---|---|---|---|---|---|
|  | HAF carbon black | 40 | 40 | 40 | 40 | 30 | 40 | 40 |
|  | Sulfur | 0.8 | 0.8 | 0.8 | 0.8 | 0.8 | 0.8 | 0.8 |
|  | Sulfur-donating compound | 0.5 | 10 | 1.5 | 1.5 | 1.0 | 1.5 | 1.5 |
|  | Organic peroxide crosslinking agent | 3.0 | 3.0 | 1.0 | 1.0 | 2.5 | 3.0 | 3.0 |
|  | Co-crosslinking agent | 10 | 10 | 10 | 10 | 7.5 | 10 | 10 |
| Polymer characteristics | Combined-styrene content (wt %) | 23.5 | 23.5 | 23.5 | 23.5 | 23.5 | 15.0 | 46.0 |
|  | A (2.5-0.2A)-B-2C-2.4D | 54 | 35 | 57 | 35 | 63 | 52 | 52 |
|  | Kneadability | ○ | ○ | ○ | ○ | ○ | ○ | ○ |
|  | Roll processability | ○ | ○ | ○ | ○ | ○ | ○ | ○ |
|  | CS properties (%): 100° C., 70 h | 9 | 10 | 10 | 8 | 6 | 9 | 9 |
|  | Maximum load (N) | 5,300 | 9,800 | 4,300 | 9,600 | 3,000 | 8,100 | 7,500 |

TABLE 3

|  |  | Comparative Example 1 | Comparative Example 2 | Comparative Example 3 | Comparative Example 4 | Comparative Example 5 | Comparative Example 6 |
|---|---|---|---|---|---|---|---|
| Formulation (part by weight) | E-SBR-1 | 100 | 100 | 100 | 100 | 100 | 100 |
|  | S-SBR-1 |  |  |  |  |  |  |
|  | E-SBR-2 |  |  |  |  |  |  |
|  | FEF carbon black | 20 | 60 | 80 | 0 | 40 | 40 |
|  | HAF carbon black | 20 | 60 | 0 | 80 | 40 | 40 |
|  | Sulfur | 0.8 | 0.8 | 0.8 | 0.8 | 0.8 | 0.8 |
|  | Sulfur-donating compound | 1.5 | 1.5 | 1.5 | 1.5 | 1.5 | 0.1 |
|  | Organic peroxide crosslinking agent | 3.0 | 3.0 | 3.0 | 3.0 | 3.0 | 3.0 |
|  | Co-crosslinking agent | 10 | 10 | 10 | 10 | 20 | 10 |
| Polymer characteristics | Combined-styrene content (wt %) | 23.5 | 23.5 | 23..5 | 23.5 | 23.5 | 23.5 |
|  | Kneadability | ○ | □ | Δ | Δ | ○ | ○ |
|  | Roll processability | ○ | □ | ○ | Δ | ○ | ○ |
|  | CS properties (%): 100° C., 70 h | 5 | — | 7 | 9 | 12 | 17 |
|  | Maximum load (N) | 2,400 | — | 5,500 | 5,700 | 8,400 | 4,300 |

Example 15

This Example exemplifies the second invention.

In each of the above-described Examples 1 to 14, a value $Y=A(2.5-0.02A)-B-2C-2.4D$ is indicated.

Thus, the values Y of Examples 1 to 14 shown in Tables 1 and 2 exemplify the Examples of the second invention.

Comparative Example 7

A composition was obtained in the same manner as in Example 1, except that, the blending amount of the co-crosslinking agent added to 100 parts by weight of the SBR polymer was 4 parts by weight. Table 4 shows a value Y.

Evaluation was performed in the same manner as in Example 1, and the results were shown in Table 4.

Comparative Example 8

A composition was obtained in the same manner as in Example 2, except that, the blending amount of the co-crosslinking agent added to 100 parts by weight of the SBR polymer was 4 parts by weight, and the sulfur-donating compound and the organic peroxide crosslinking agent were added at, respectively, 0.625 time (0.5 part by weight based on 100 parts by weight of the SBR polymer) and 1.25 times (1.0 part by weight based on 100 parts by weight of the SBR polymer) the parts by weight of the sulfur (0.8 part by weight based on 100 parts by weight of the SBR polymer). Table 4 shows a value Y.

Evaluation was performed in the same manner as in Example 1, and the results were shown in Table 4.

TABLE 4

|  |  | Comparative Example 7 | Comparative Example 8 |
|---|---|---|---|
| Formulation (part by weight) | E-SBR-1 | 100 | 100 |
|  | S-SBR-1 |  |  |
|  | E-SBR-2 |  |  |
|  | FEF carbon black | 30 | 40 |
|  | HAF carbon black | 30 | 40 |
|  | Sulfur | 0.8 | 0.8 |
|  | Sulfur-donating compound | 1.5 | 0.5 |
|  | Organic peroxide crosslinking agent | 3.0 | 1.0 |
|  | Co-crosslinking agent | 4 | 4 |
| Polymer characteristics | Combined styrene content (wt %) | 23.5 | 23.5 |
|  | A(2.5-0.02A)-B-2C-2.4D | 64 | 65 |
|  | Kneadability | ○ | ○ |
|  | Roll processability | ○ | ○ |
|  | CS properties (%): 100° C. * 70 h | 6 | 6 |
|  | Maximum load (N) | 2,800 | 2,400 |

I claim:

1. An SBR composition for a torsional damper, the SBR composition comprising:
   (a) an SBR polymer having a combined styrene content of 10 wt % to 50 wt %;
   (b) carbon black comprising FEF grade carbon black and HAF grade carbon black blended at a ratio of FEF:HAF=1:3 to 3:1;
   (c) a crosslinking system including sulfur, a sulfur-donating compound, and an organic peroxide compound; and
   (d) a co-crosslinking agent,
   wherein 60 parts by weight to 100 parts by weight of the carbon black as total parts by weight of the FEF grade carbon black and the HAF grade carbon black is blended based on 100 parts by weight of the SBR polymer,
   0.4 part by weight to 2.5 parts by weight of the sulfur is blended based on 100 parts by weight of the SBR polymer, and the sulfur-donating compound is blended at 0.625 time to 12.5 times the blending amount of the sulfur,
   the organic peroxide compound is blended at 1.25 times to 12.5 times the blending amount of the sulfur, and
   4 parts by weight to 16 parts by weight of the co-crosslinking agent is blended based on 100 parts by weight of the SBR polymer.

2. An SBR composition for a torsional damper, the SBR composition comprising:
   (a) an SBR polymer having a combined styrene content of 10 wt % to 50 wt %;
   (b) carbon black comprising FEF grade carbon black and HAF grade carbon black blended at a ratio of FEF:HAF=1:3 to 3:1;
   (c) a crosslinking system including sulfur, a sulfur-donating compound, and an organic peroxide compound; and
   (d) a co-crosslinking agent,
   wherein a value Y of Formula (1) below is Y≤63, $$Y=A(2.5-0.02A)-B-2C-2.4D \quad \text{Formula (1)}$$

where A is total parts by weight of the FEF grade carbon black and the HAF grade carbon black based on 100 parts by weight of the SBR polymer; B is the number of parts by weight of the co-crosslinking agent based on 100 parts by weight of the SBR polymer; C is the number of parts by weight of the sulfur-donating compound based on 100 parts by weight of the SBR polymer; and D is the number of parts by weight of the organic peroxide crosslinking agent based on 100 parts by weight of the SBR polymer.

3. A torsional damper, comprising a crosslinked product obtained by crosslinking the SBR composition for a torsional damper according to claim 1.

4. A torsional damper, comprising a crosslinked product obtained by crosslinking the SBR composition for a torsional damper according to claim 2.

* * * * *

UNITED STATES PATENT AND TRADEMARK OFFICE
CERTIFICATE OF CORRECTION

PATENT NO. : 10,309,476 B2
APPLICATION NO. : 15/523772
DATED : June 4, 2019
INVENTOR(S) : Tetsuro Negami Page 1 of 1

It is certified that error appears in the above-identified patent and that said Letters Patent is hereby corrected as shown below:

In the Specification

Column 5, Line 59, "determined so as to satisfy Y 63, where Y is a value" should read -- determined so as to satisfy $Y \leq 63$, where Y is a value --

Signed and Sealed this
Twenty-fourth Day of September, 2019

Andrei Iancu
*Director of the United States Patent and Trademark Office*